United States Patent
Yang et al.

(10) Patent No.: US 7,995,155 B2
(45) Date of Patent: Aug. 9, 2011

(54) LIQUID CRYSTAL DISPLAY

(75) Inventors: Young-Chol Yang, Seongnam-si (KR); JianGang Lu, Suwon-si (KR); Seung-Hoon Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 463 days.

(21) Appl. No.: 12/275,673

(22) Filed: Nov. 21, 2008

(65) Prior Publication Data
US 2009/0135323 A1    May 28, 2009

(30) Foreign Application Priority Data

Nov. 26, 2007   (KR) .......................... 10-2007-0121092

(51) Int. Cl.
*G02F 1/136*      (2006.01)
*G02F 1/1343*     (2006.01)
(52) U.S. Cl. .............................. 349/48; 349/144; 349/39
(58) Field of Classification Search .................... 349/48, 349/144, 38, 39, 37
See application file for complete search history.

(56) References Cited

U.S. PATENT DOCUMENTS
7,834,949 B2 * 11/2010 Tasaka et al. .................. 349/48

FOREIGN PATENT DOCUMENTS
| JP | 2005-258417 | 9/2005 |
|----|-------------|--------|
| KR | 1020050060730 | 6/2005 |
| KR | 1020060085012 | 7/2006 |

* cited by examiner

*Primary Examiner* — Thoi V Duong
(74) *Attorney, Agent, or Firm* — F. Chau & Associates, LLC

(57) ABSTRACT

A liquid crystal display includes first and second gate lines arranged in parallel to each other and sequentially transmitting a gate voltage, a data line crossing the first and second gate lines and transmitting a data voltage, a pixel electrode constituted by first and second sub-pixel electrodes and electrically disconnected from each other, a first switching element connected to the first gate line, the data line, and the first sub-pixel electrode, a second switching element connected to the first gate line, the data line, and the second sub-pixel electrode, a third switching element connected to the first sub-pixel electrode across a charge-sharing capacitor, and a fourth switching element connected to the second gate line and the second sub-pixel electrode and connected to the first sub-pixel electrode across the charge-sharing capacitor.

20 Claims, 8 Drawing Sheets

LIQUID CRYSTAL DISPLAY

CROSS-REFERENCE TO RELATED APPLICATION

This application is based on and claims priority from Korean Patent Application No. 10-2007-0121092 filed on Nov. 26, 2007, the disclosure of which is incorporated by reference herein.

BACKGROUND OF THE INVENTION

1. Technical Field

The present invention relates to a display apparatus, and, more particularly, to a liquid crystal display.

2. Discussion of the Related Art

A liquid crystal display is one of the most widely used flat panel displays. Liquid crystal displays include two panels provided with field-generating electrodes such as pixel electrodes and a common electrode and a liquid crystal layer interposed therebetween. The liquid crystal display displays images by applying voltages to the field-generating electrodes to generate an electric field in the liquid crystal layer, which determines orientations of liquid crystal molecules in the liquid crystal layer to adjust polarization of incident light.

A vertical alignment mode liquid crystal display, in which liquid crystal molecules are aligned such that the long axes of the liquid crystal molecules are perpendicular to the two panels (i.e., upper and lower panels) in the absence of an electric field, has become the focus of attention because of its high contrast ratio and wide reference viewing angle, which is defined as a viewing angle making the contrast ratio equal to 1:10 or as a limit angle for the inversion in luminance (brightness) between the grays.

In the vertical alignment mode liquid crystal display, the wide viewing angle can be achieved by forming cutouts in field-generating electrodes and forming protrusions on the field-generating electrodes. Since the cutouts and the protrusions can determine the tilt directions of the liquid crystal LC molecules, the tilt directions can be distributed into several directions by using the cutouts and the protrusions such that the reference viewing angle is widened.

The conventional vertical alignment mode liquid crystal display has relatively poor lateral visibility compared with front visibility. For example, a patterned VA (PVA) mode LCD having the cutouts shows an image that becomes bright as it goes far from the front, and, in the worst case, the luminance difference between high grays vanishes such that the images cannot be perceived.

SUMMARY OF THE INVENTION

Accordingly, embodiments of the present invention provide a liquid crystal display which can prevent a reduction in the brightness of the display while improving lateral visibility.

According to an exemplary embodiment of the present invention, there is provided a liquid crystal display including first and second gate lines arranged in parallel to each other and sequentially transmitting a gate voltage, a data line crossing the first and second gate lines and transmitting a data voltage, a pixel electrode constituted by first and second sub-pixel electrodes electrically disconnected from each other, a first switching element connected to the first gate line, the data line, and the first sub-pixel electrode, a second switching element connected to the first gate line, the data line, and the second sub-pixel electrode, a third switching element connected to the first sub-pixel electrode across a charge-sharing capacitor, and a fourth switching element connected to the second gate line and the second sub-pixel electrode and connected to the first sub-pixel electrode across the charge-sharing capacitor.

According to another exemplary embodiment of the present invention, there is provided a liquid crystal display including a gate driver driving first and second gate lines arranged in parallel to each other and sequentially transmitting a gate voltage, a data driver driving a data line crossing the first and second gate lines and transmitting a data voltage, a signal controller controlling the gate driver and the data driver, a pixel electrode constituted by first and second sub-pixel electrodes electrically disconnected from each other, a first switching element connected to the first gate line, the data line, and the first sub-pixel electrode, a second switching element connected to the first gate line, the data line, and the second sub-pixel electrode, a third switching element connected to the first sub-pixel electrode across a charge-sharing capacitor; and a fourth switching element connected to the second gate line and the second sub-pixel electrode and connected to the first sub-pixel electrode across the charge-sharing capacitor.

BRIEF DESCRIPTION OF THE DRAWINGS

Exemplary embodiments of the present invention will become apparent by reference to the following detailed description taken in conjunction with the accompanying drawings, wherein.

DETAILED DESCRIPTION OF EXEMPLARY EMBODIMENTS

Figure 1:
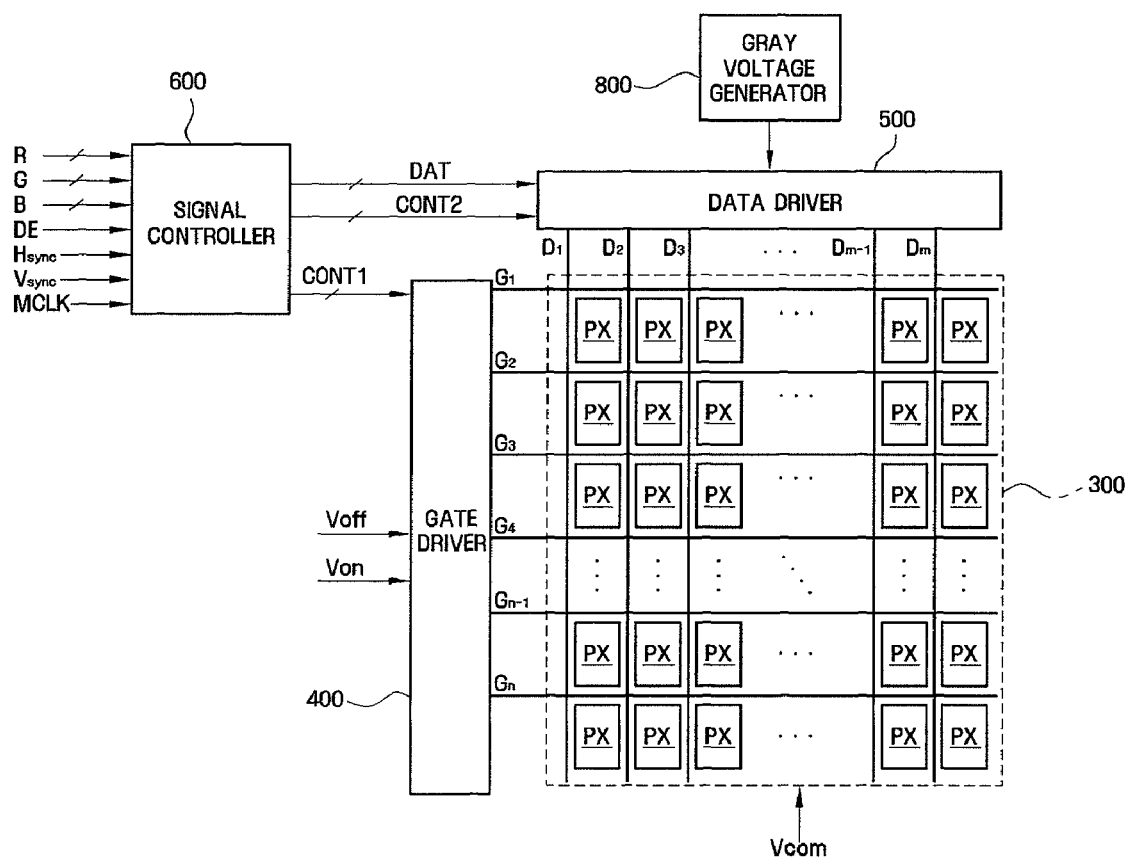
FIG. 1 is a block diagram of a liquid crystal display according to an exemplary embodiment of the present invention.

Hereinafter, exemplary embodiments of the present invention will be described in detail with reference to the accompanying drawings. Like reference numerals refer to like elements throughout the specification and drawings.

Referring to FIG. 1, the liquid crystal display includes a liquid crystal panel assembly 300, a gate driver 400 and a data driver 500 operatively connected to the liquid crystal panel assembly 300, a gray-voltage generator 800 operatively connected to the data driver 500, and a signal controller 600 for controlling the gate driver 400 and the data driver 500.

The liquid crystal panel assembly 300 includes a plurality of display signal lines (gate lines $G_1$-$G_n$ and data lines $D_1$-$D_m$) and a plurality of pixels PX connected to the signal lines and arranged in a matrix. The liquid crystal panel assembly 300 includes lower and upper panels which face each other and a liquid crystal layer interposed between the panels (not shown).

The display signal lines include a plurality of gate lines $G_1$-$G_n$ for transmitting gate signals (also referred to as scan signals) and a plurality of data lines $D_1$-$D_m$ for transmitting data signals to individual pixels. The gate lines $G_1$-$G_n$ substantially extend in a row (e.g., horizontal) direction and are parallel to each other, and the data lines $D_1$-$D_m$ substantially extend in a column (e.g., vertical) direction and are perpendicular to the gate lines $G_1$-$G_n$.

Each pixel PX includes a switching element connected to one of the gate lines $G_1$-$G_n$ and to one of the data lines $D_1$-$D_m$, a liquid crystal (LC) capacitor operatively connected to the switching element, and a storage capacitor. The storage capacitor may be cascade-connected to the switching element and the LC capacitor if necessary.

The switching element of each pixel PX is composed of a thin film transistor (TFT) and is a three-terminal element having a control terminal connected to each of the gate lines $G_1$-$G_n$, an input terminal connected to each of the data lines $D_1$-$D_m$, and an output terminal connected to the LC capacitor.

The gate driver 400 is connected to the gate lines $G_1$-$G_n$ of the liquid crystal panel assembly 300, applies the gate signals (composed of a combination of a gate-on voltage Von and a gate-off voltage Voff) to the gate lines $G_1$-$G_n$. Although FIG. 1 shows that the gate driver 400 is provided at one side of the liquid crystal panel assembly 300 to be connected to the gate lines $G_1$-$G_n$, the invention is not limited thereto, a pair of gate drivers may be provided at opposite sides of the liquid crystal panel assembly 300 to be connected to the respective gate lines $G_1$-$G_n$ at the same time. In a large liquid crystal display, for example, it is difficult to transmit the gate-on voltage Von or the gate-off voltage Voff to the gate lines $G_1$-$G_n$ using only one gate driver. Thus, a couple of gate drivers are provided at opposite sides of each of the gate lines $G_1$-$G_n$. The gate driver 400 can be incorporated into the lower panel of the liquid crystal assembly 300 as an IC chip having one or more TFTs.

The gray voltage generator 800 generates a gray voltage associated with the transmission of each pixel. The gray voltage is provided to each pixel and has a positive polarity and a negative polarity with respect to a common voltage Vcom.

The data driver 500 is connected to the data lines $D_1$-$D_m$ of the liquid crystal panel assembly 300, and applies the gray voltage output from the gray voltage generator 800 to each pixel as a data voltage. When the gray voltage generator 800 only provides a predetermined number of reference gray voltages instead of supplying gray voltages for all grays, the data driver 500 generates a gray voltage for all grays by dividing the reference gray voltage, and selects one among them.

The gate driver 400 or the data driver 500 may be integrated in the liquid crystal panel assembly 300 together with the display signal lines $G_1$-$G_n$ and $D_1$-$D_m$ and TFTs may be mounted on a flexible printed circuit film (not shown) to be attached to the liquid crystal panel assembly 300 in a tape carrier package form.

The data driver 500 can be mounted directly on a liquid crystal panel assembly 300 as an IC chip. Alternatively, the data driver 500 can be attached on the liquid crystal panel assembly 300 as a TCP by being mounted on a flexible printed circuit film (not shown).

The signal controller 600 controls the gate driver 400 and the data driver 500

The signal controller 600 receives an input control signal including a vertical synchronization signal $V_{sync}$, a horizontal synchronizing signal $H_{sync}$, a main clock signal MCLK, a data enable signal DE, and others, from an external graphics controller (not shown) for controlling display of input image signals R, G and B. The signal controller 600 processes image signals R, G and B based on the input image signals R, G, and B and the input control signals received by the signal controller 600 to be suitable to an operating condition of the liquid crystal panel assembly 300. Then, the signal controller 600 generates a gate control signal CONT1 and a data control signal CONT2, and outputs them to the gate driver 400 and data driver 500, respectively.

The gate control signal CONT1 includes a scan start signal STV indicating the start of an operation, e.g., scanning, of the gate driver 400, and at least one clock signal for controlling output time of the gate-on voltage Von. The gate control signal CONT1 may further include an output enable signal OE for defining the duration of the gate-on voltage Von.

The data control signal CONT2 includes a horizontal synchronization start signal STH that indicates that valid data is transmitted to a row of pixels, a load signal LOAD for applying the respective data voltages to the data lines $D_1$-$D_m$, and a data clock signal HCLK. The data control signal CONT2 may further include a reverse signal RVS for reversing the polarity of the data voltage with respect to the common voltage Vcom, which is referred to as the "polarity of the data voltage" hereinafter.

The data driver 500 receives image data DAT for each pixel PX, selects gray voltages corresponding to the image data DAT supplied from the gray voltage generator 800 in response to the data control signals CONT2 from the signal controller 600, converts the image data DAT into corresponding data voltages, and applies the converted data voltages to the respective data lines $D_1$-$D_m$.

The gate driver 400 sequentially applies the gate-on voltage Von to the gate lines $G_1$-$G_n$ and turns ON the switching elements connected to the gate lines $G_1$-$G_n$ in accordance with the gate control signal CONT1 output from the signal controller 600. The data voltages applied to the data lines $D_1$-$D_m$ are applied to each pixel PX through the turned-ON switching elements.

The difference between the common voltage Vcom and the data voltage applied to the data line of each pixel PX is applied across the pixel and appears as a charge voltage of the LC capacitor, that is, a pixel voltage. The arrangement (orientations) of liquid crystal molecules varies depending on the size of the pixel voltage and thus the polarization of the light passing through the liquid crystal layer varies. The liquid crystal molecules have orientations depending on the magnitude of the pixel voltage and the orientations determine the polarization of light passing through the LC capacitor.

In the liquid crystal display according to an exemplary embodiment of the present invention, after applying the same data voltage to a pair of sub pixels constituting each pixel PX, the gate-on voltage Von is applied to a gate line adjacent to the gate line corresponding to the pair of sub pixels. In this case, the data voltage charged in either one of the sub pixels is decreased by charge sharing. Since the sub pixels of the same pixel electrode are charged with different voltages, a gamma curve of a pixel PX becomes a merged gamma curve of the two sub pixels. When the data voltages charged in the respective sub pixels are determined by charge sharing, the frontal merged gamma curve is made to be close to the frontal reference gamma curve, and the lateral merged gamma curve is made to be closest to the frontal reference gamma curve and the frontal merged gamma curve of the two sub pixels is close to the frontal reference gamma curve, thereby improving lateral visibility.

Figure 2:
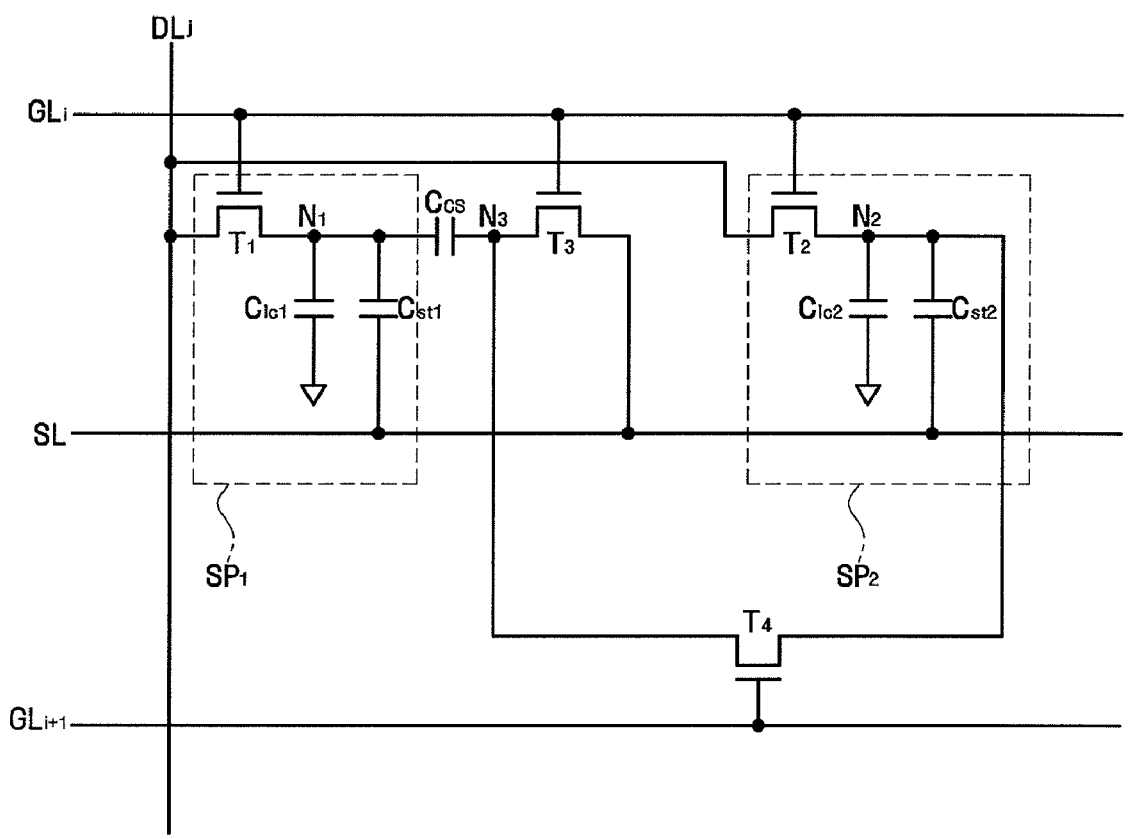
FIG. 2 is an equivalent circuit diagram of one pixel of the liquid crystal display shown in FIG. 1.

Referring to FIG. 2, the liquid crystal display according to an exemplary embodiment of the present invention includes include a plurality of gate lines $GL_1$-$GL_{i+1}$ transmitting a gate signal and a plurality of data lines $DL_i$ crossing the gate lines $GL_1$-$G_{i+1}$ and transmitting a data signal.

Each pixel PX includes a first sub pixel $SP_1$ and a second sub pixel $SP_2$. The first sub pixel $SP_1$ includes a first switching element $T_1$, a first LC capacitor $C_{lc1}$ and a first storage capacitor $C_{st1}$, and the second sub pixel $SP_2$ includes a second switching element $T_2$, a second LC capacitor $C_{lc2}$ and a second storage capacitor $C_{st2}$, respectively.

A first switching element $T_1$ and a second switching element $T_2$ are formed at an intersection point of an ith gate line $GL_i$ and an nth data line $DL_i$, a third switching element $T_3$ connected to the ith gate line $GL_i$, and a fourth switching element $T_4$ is connected to the (i+1th) gate line gate $GL_{i+1}$. The first through fourth switching elements may be thin film transistors (TFTs).

The first switching element $T_1$ has a control terminal connected to the ith gate line $GL_i$, an input terminal connected to a jth data line $DL_j$, and an output terminal connected to the first LC capacitor $C_{lc1}$ and the first storage capacitor $C_{st1}$. The second switching element $T_2$ has a control terminal connected to the ith gate line $GL_i$, an input terminal connected to a jth data line $DL_j$, and an output terminal connected to the second LC capacitor $C_{lc2}$ and the second storage capacitor $C_{st2}$. The third switching element $T_3$ has a control terminal connected to the ith gate line $GL_i$, an output terminal connected to the output terminal of the first switching element $T_1$ with a charge-sharing capacitor $C_{CS}$ interdisposed therebetween, and an input terminal connected to a storage line SL. In more detail, the input terminal of the third switching element $T_3$ is directly connected to the storage line SL. The fourth switching element $T_4$ has a control terminal connected to the (i+1)th gate line $GL_{i+1}$, an input terminal connected to the output terminal of the second switching element $T_2$, and an output terminal connected to the output terminal of the third switching element $T_3$. Accordingly, the output terminal of the fourth switching element $T_4$ is connected to the output terminal of the first switching element $T_1$ with the charge-sharing capacitor $C_{CS}$ interposed therebetween.

Each pixel PX includes a pixel electrode consisting of a first sub-pixel electrode connected to the output terminal of the first switching element $T_1$, and a second sub-pixel electrode connected to the output terminal of the second switching element $T_2$. A common electrode is provided on the upper panel facing the lower panel.

The first LC capacitor $C_{lc1}$ includes a first sub-pixel electrode connected to the first switching element $T_1$, a common electrode, and liquid crystals interposed therebetween. The first storage capacitor $C_{st1}$ includes a first sub-pixel electrode, a storage electrode line SL that is provided on the lower panel with an insulator disposed therebetween.

The second LC capacitor $C_{lc2}$ includes a second sub-pixel electrode connected to the second switching element $T_2$, a common electrode, and liquid crystals interposed therebetween. The second storage capacitor $C_{st2}$ includes a second sub-pixel electrode, a storage electrode line SL that is provided on the lower panel, and an insulator disposed between the second sub-pixel electrode and the storage electrode line SL.

The charge-sharing capacitor $C_{CS}$ includes an output terminal of the first switching element $T_1$, an output terminal of the third switching element $T_3$, and an insulator disposed therebetween. The charge-sharing capacitor $C_{CS}$ and the third switching element $T_3$ function to decrease the pixel voltages charged in the second LC capacitor $C_{lc2}$ while increasing the pixel voltages charged in the first LC capacitor $C_{lc1}$.

The first storage capacitor $C_{st1}$ and the second storage capacitor $C_{st2}$ sustain pixel voltages charged in the first LC capacitor $C_{lc1}$ and the second LC capacitor $C_{lc2}$, respectively. A fixed voltage, e.g., a common voltage Vcom, is applied to the storage line SL.

If a gate-on signal Von is applied to the ith gate line $GL_i$, a data voltage of the same level is transmitted to the first and second sub-pixel electrodes in the ith row of pixels through the first switching element $T_1$ and the second switching element $T_2$. That is, the same data voltage is charged in the first LC capacitor $C_{lc1}$ and the second LC capacitor $C_{lc2}$ connected to the ith gate line $GL_i$. The data voltage charged in the first LC capacitor $C_{lc1}$ and the second LC capacitor $C_{lc2}$ is referred to as a pixel voltage.

If a gate-on voltage Von is applied to the ith gate line $GL_i$, the third switching element $T_3$ is turned on and the common voltage Vcom is transmitted to the output terminal of the third switching element $T_3$. Thus, a voltage corresponding to a difference between the data voltage and the common voltage Vcom is charged in the charge-sharing capacitor $C_{CS}$.

If a gate-off voltage Voff is then applied to the ith gate line $GL_i$, the first sub pixel $SP_1$ and the second sub pixel $SP_2$ are electrically disconnected from each other. That is, after a data voltage of the same level is applied to the first sub-pixel electrode and the second sub-pixel electrode, the first sub-pixel electrode and the second sub-pixel electrode are maintained at a floating state.

If the gate-on signal Von is applied to the (i+1)th gate line $GL_{i+1}$, a data voltage of the same level is transmitted a pair of second sub-pixel electrodes in the (i+1)th row of pixels through a first switching element (not shown) and a second switching element (not shown) connected to the (i+1)th gate line $GL_{i+1}$.

In addition, if the gate-on signal Von is applied to the (i+1)th gate line $GL_{i+1}$, the fourth switching element $T_4$ is turned on. Accordingly, the data voltage stored in the second sub-pixel electrode connected to the second switching element $T_2$ is distributed to the charge-sharing capacitor $C_{CS}$ through the fourth switching element $T_4$. This is because the input terminal of the fourth switching element $T_4$ is connected to the output terminal of the second switching element $T_2$ and the output terminal of the fourth switching element $T_4$ is connected to the charge-sharing capacitor $C_{CS}$. Accordingly, data voltages stored in the first sub-pixel electrode and the second sub-pixel electrode in the ith row of pixels and connected to the first switching element $T_1$ and the second switching element $T_2$ will have different levels.

Next, pixel voltages of the first sub-pixel electrode and the second sub-pixel electrode will be described in detail using the principle of conservation of charge. Here, a first node $N_1$ is a node between the output terminal of the first switching element $T_1$ and the charge-sharing capacitor $C_{CS}$, a second node $N_2$ is a node between the output terminal of the second switching element $T_2$ and the input terminal of the fourth switching element $T_4$, a third node $N_3$ is a node between the charge-sharing capacitor $C_{CS}$ and the output terminal of the third switching element $T_3$. The third node $N_3$ may also be a node between the charge-sharing capacitor $C_{CS}$ and the output terminal of the fourth switching element $T_4$.

If the gate-on signal Von is applied to the ith gate line $GL_i$, the first switching element $T_1$ and the second switching element $T_2$ are turned on so that a data voltage Vd is applied to the first node $N_1$ and the second node $N_2$. As the third switching element $T_3$ is turned on, the common voltage $V_{com}$ is applied to the third node $N_3$. For explanatory convenience, it is assumed that a common voltage $V_{com}$ is 0 V, a data voltage Vd is defined as a relative voltage with respect to the common voltage $V_{com}$. Therefore, voltages applied to a first node $N_1$, a second node $N_2$ and a third node $N_3$ are Vd, Vd, and 0, respectively. It is also assumed that the capacitance sum of the first LC capacitor $C_{lc1}$ and the first storage capacitor $C_{st1}$, is denoted by Ch, the capacitance sum of the second LC capacitor $C_{lc2}$ and the second storage capacitor $C_{st2}$ is denoted by Cl, and the capacitance of the charge-sharing capacitor $C_{CS}$ is denoted by Cb.

The quantity of charge Qh corresponding to the capacitance sum of the first LC capacitor $C_{lc1}$ and the first storage capacitor $C_{st1}$, the quantity of charge Ql corresponding to the capacitance sum of the second LC capacitor $C_{lc2}$ and the second storage capacitor $C_{st2}$, and the quantity of charge Qb of the charge-sharing capacitor $C_{CS}$ are given by the following equation (1):

$$Qh = Ch \times Vd$$

$$Ql = Cl \times Vd$$

$$Qb = Cb \times Vd$$

Next, if the gate-off voltage Voff is applied to the ith gate line $GL_i$ and the gate-on signal Von is applied to the (i+1)th gate line $GL_{i+1}$, the first switching element $T_1$, the second switching element $T_2$ and the third switching element $T_3$ are turned off and the fourth switching element $T_4$ is turned on.

Assuming that voltages applied to the first node $N_1$, the second node $N_2$ and the third node $N_3$ are V1, V2 and V3 (=V2), respectively, the quantity of charge Qh' corresponding to the capacitance sum of the first LC capacitor $C_{lc1}$ and the first storage capacitor $C_{st1}$, the quantity of charge Ql' corresponding to the capacitance sum of the second LC capacitor $C_{lc2}$ and the second storage capacitor $C_{st2}$ and the quantity of charge Qb' of the charge-sharing capacitor $C_{CS}$ are given by the following equation (2):

$$Qh' = Ch \times V1$$

$$Ql' = Cl \times V2$$

$$Qb' = Cb \times (V1 - V2)$$

Since total quantity of charge in capacitors connected to the first node $N_3$ is conserved, the following equation (3) is satisfied:

$$Qh + Qb = Qh' + Qb'$$

Since total quantity of charge in capacitors connected to the third node $N_3$ is conserved, the following equation (4) is satisfied:

$$Ql - Qb = Ql' - Qb'$$

Based on the relationships (1) through (4), the voltages V1 and V2 applied to the first node $N_1$ and the second node $N_2$ can be obtained using the following equation (5):

$$V1 = Vd\left(1 + \frac{Cl \cdot Cb}{Cl \cdot Ch + Ch \cdot Cb + Cb \cdot Cl}\right)$$

$$V2 = Vd\left(1 - \frac{Ch \cdot Cb}{Cl \cdot Ch + Ch \cdot Cb + Cb \cdot Cl}\right)$$

If a data voltage Vd is a positive-polarity voltage greater than the common voltage $V_{com}$ (e.g., 0 V), the pixel voltage V1 of the first sub pixel $SP_1$ rises compared to the data voltage Vd, while the pixel voltage V2 of the second sub pixel $SP_2$ drops compared to the data voltage Vd. In contrast, if a data voltage Vd is a negative-polarity voltage smaller than the common voltage $V_{com}$ (e.g., 0 V), the pixel voltage V1 of the first sub pixel $SP_1$ drops compared to the data voltage Vd, while the pixel voltage V2 of the second sub pixel $SP_2$ rises compared to the data voltage Vd. Accordingly, the absolute value of the pixel voltage V1 of the first sub pixel $SP_1$ is larger than that of the pixel voltage V2 of the second sub pixel $SP_2$ all the time.

As described above, if the pixel voltages V1 and V2 applied to the first sub pixel $SP_1$ and the second sub pixel $SP_2$ constituting one and the same pixel are different from each other, the lateral visibility can be improved. Sets of gray voltages having different gamma curves obtained from image information are stored in the first sub pixel $SP_1$, and a gamma curve of a pixel constituted by the first sub pixel $SP_1$ and the second sub pixel $SP_2$ is close to the merged gamma curve of the first and second sub pixels $SP_1$ and $SP_2$. Accordingly, when determining the sets of gray voltages, the frontal merged gamma curve is preferably made to be close to the frontal reference gamma curve and the lateral merged gamma curve is preferably made to be closest to the frontal reference gamma curve, thereby improving the lateral visibility.

Figure 3:
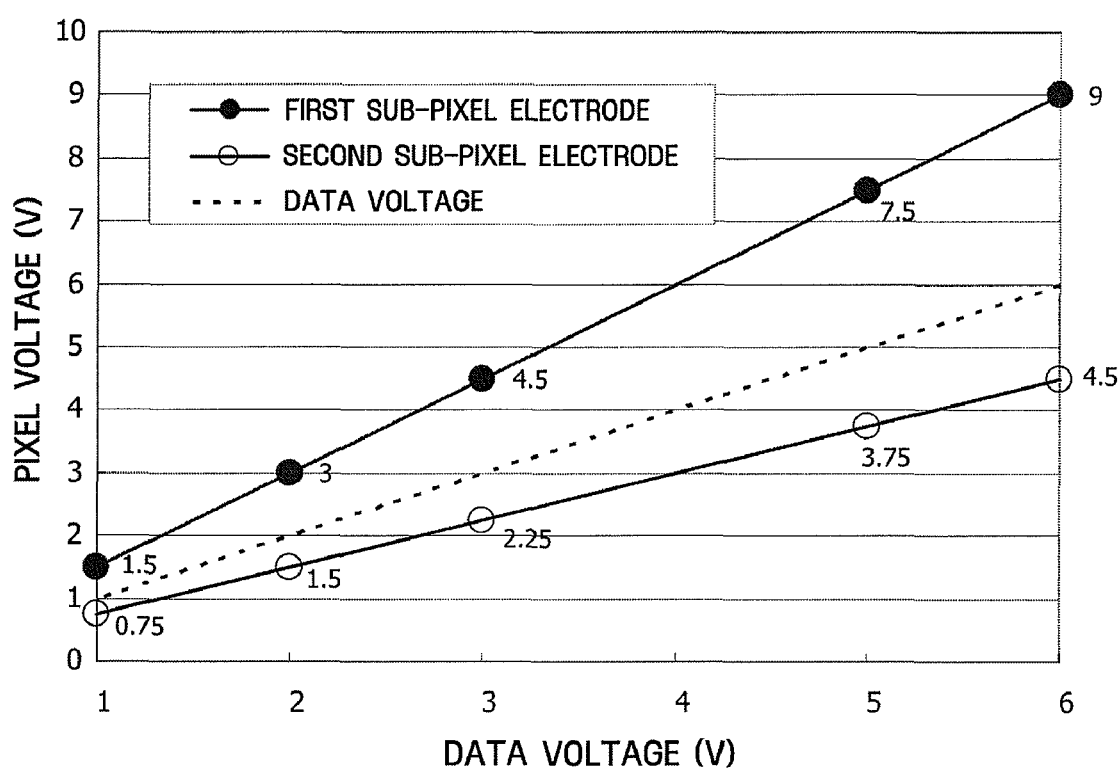
FIG. 3 is a graph showing the relationship between a data voltage and a pixel voltage in the liquid crystal display shown in FIG. 1.

FIG. 3 is a graph showing a change in the pixel voltage of a first sub-pixel electrode and a second sub-pixel electrode with respect to the data voltage applied across data lines shown in FIG. 1, in which the pixel voltage is calculated based on the charge ratio Cl:Ch:Cb=2:1:2, for example.

As shown in FIG. 3, when a data voltage applied to data lines is 6 V, the pixel voltage of the first sub-pixel electrode is 9 V, as represented by the plotted line (-●-), increased by 3 V, while the pixel voltage of the second sub-pixel electrode is 4.5 V, as represented by the plotted line (-○-), decreased by 1.5 V. Therefore, a sufficiently large difference can be obtained between the pixel voltages charged in the first and second sub-pixel electrodes. In particular, since a difference between the pixel voltage of the second sub-pixel electrode and the data voltage, as represented by the dotted line, is not sufficiently large, a sharp reduction in the brightness can be suppressed.

Figure 4:
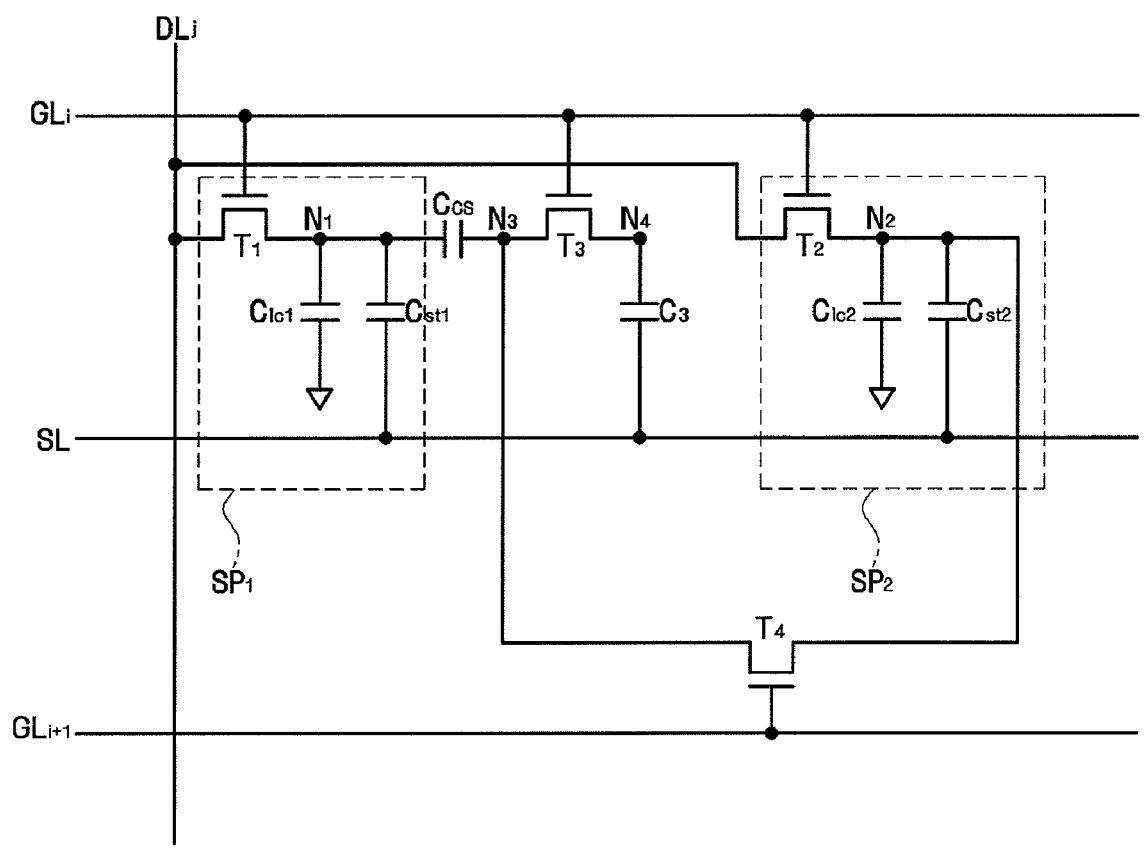
FIG. 4 is an equivalent circuit diagram of one pixel of a liquid crystal display according to an exemplary embodiment of the present invention.
Figure 5:
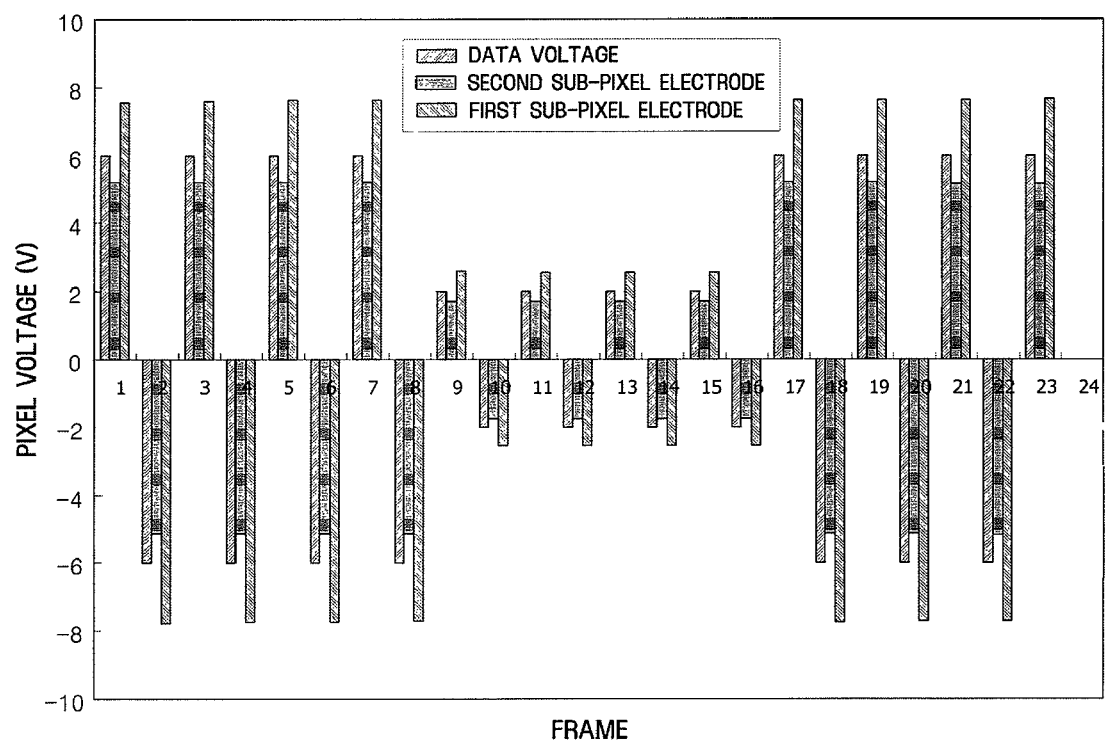
FIG. 5 is a graph showing the relationship between a data voltage and a pixel voltage in the liquid crystal display shown in FIG. 3.

Hereinafter, a liquid crystal display according to an exemplary embodiment of the present invention will be described in detail with reference to FIGS. 4 and 5. FIG. 4 is an equivalent circuit diagram of one pixel of a liquid crystal display according to an exemplary embodiment of the present invention, and FIG. 5 is a graph showing the relationship between a data voltage and a pixel voltage in the liquid crystal display shown in FIG. 3. For explanatory convenience, components each having the same function for describing the exemplary embodiment shown in FIGS. 1 through 3 are respectively identified by the same reference numerals, and their detailed descriptions will not be repeated.

Referring to FIG. 4, a third switching element $T_3$ has a control terminal connected to an ith gate line $GL_i$, an output terminal connected to the output terminal of a first switching element $T_1$ with a charge-sharing capacitor $C_{CS}$ disposed therebetween, and an input terminal connected to a storage line SL. In more detail, the input terminal of the third switching element $T_3$ is directly connected to the storage line SL with an auxiliary capacitor $C_3$ disposed therebetween. The input terminal of the third switching element $T_3$ and the storage line SL, which are formed at different layers in the LCD manufacturing process, are quite difficult to be directly coupled to each other. In such a case, the auxiliary capacitor $C_3$ may be used for coupling the input terminal of the third switching element $T_3$ to the storage line SL.

Next, pixel voltages of the first sub-pixel electrode and the second sub-pixel electrode will be described in detail using the principle of conservation of charge. Here, a fourth node $N_4$ is a node between the input terminal of the third switching element $T_3$ and the auxiliary capacitor $C_3$. For explanatory convenience, it is assumed that a common voltage $V_{com}$ is 0 V, a data voltage Vd is defined as a relative voltage with respect to the common voltage $V_{com}$, and the capacitance of an auxiliary capacitor $C_3$ is denoted by Cc.

In addition, assuming that voltages applied to a first node $N_1$, a second node $N_2$, a third node $N_3$ and a fourth node $N_4$ are V1, V2, V3, and V4, respectively, for an (n−1)th frame, V2=V3. The quantity of charge Qh corresponding to the capacitance sum of the first LC capacitor $C_{lC1}$ and the first storage capacitor $C_{st1}$, the quantity of charge Ql corresponding to the capacitance sum of the second LC capacitor $C_{lc2}$ and the second storage capacitor $C_{st2}$, the quantity of charge Qb of the charge-sharing capacitor $C_{CS}$, and the quantity of charge Qc of the auxiliary capacitor $C_3$ are given by the following equation (6):

$$Qh = Ch \times V1$$

$$Ql = Cl \times V2$$

$$Qb = Cb \times (V1-V3) = Cb \times (V1-V2)$$

$$Qc = Cc \times V4$$

If the gate-on signal Von is applied to the ith gate line $GL_i$ for an nth frame, the first switching element $T_1$ and the second switching element $T_2$ are turned on so that the data voltage Vd is applied to the first node $N_1$ and the second node $N_2$. As the third switching element $T_3$ is turned on, the third node $N_3$ and the fourth node $N_4$ are connected to each other. Here, assuming that voltages of the first node $N_1$, the second node $N_2$, the third node $N_3$, and the fourth node $N_4$ are V1', V2', V3', and V4', respectively, V1'=V2'=Vd, and V3'=V4'.

In this case, the quantity of charge Qh' corresponding to the capacitance sum of the first LC capacitor $C_{lc1}$ and the first storage capacitor $C_{st1}$, the quantity of charge Ql' corresponding to the capacitance sum of the second LC capacitor $C_{lc2}$ and the second storage capacitor $C_{st2}$, the quantity of charge Qb' of the charge-sharing capacitor $C_{CS}$, and the quantity of charge Qc' of the auxiliary capacitor $C_3$ are given by the following equation (7):

$$Qh' = Ch \times V1' = Ch \times Vd$$

$$Ql' = Cl \times V2' = Cl \times Vd$$

$$Qb' = Cb \times (V1'-V3') = Cb \times (Vd-V3')$$

$$Qc' = Cc \times V4' = Cc \times V3'$$

Since the total quantity of charge in capacitors connected to the third node $N_3$ and the fourth node $N_4$ is conserved, the following relationship given by the equation (8) is satisfied:

$$Qc - Qb = Qc' - Qb'$$

Next, if a gate-off voltage Voff is applied to the ith gate line $GL_i$ and the gate-on signal Von is applied to the (i+1)th gate line $GL_{i+1}$, the first switching element $T_1$, the second switching element $T_2$ and the third switching element $T_3$ are turned off and the fourth switching element $T_4$ is turned on.

Assuming that voltages of the first node $N_1$, the second node $N_2$, the third node $N_3$, and the fourth node $N_4$ are V1", V2", V3" and V4", respectively, V2"=V3". In this case, the quantity of charge Qh" corresponding to the capacitance sum of the first LC capacitor $C_{lc1}$ and the first storage capacitor $C_{st1}$, the quantity of charge Ql" corresponding to the capacitance sum of the second LC capacitor $C_{lc2}$ and the second storage capacitor $C_{st2}$, the quantity of charge Qb" of the charge-sharing capacitor $C_{CS}$, and the quantity of charge Qc" of the auxiliary capacitor $C_3$ are given by the following equation (9):

$$Qh'' = Ch \times V1''$$

$$Ql'' = Cl \times V2''$$

$$Qb'' = Cb \times (V1''-V3'') = Cb \times (V1''-V2'')$$

$$Qc'' = Cc \times V4''$$

Since the total quantity of charge in capacitors connected to the first node $N_1$ is conserved, the following equation (10) is satisfied:

$$Qh' + Qb' = Qh'' + Qb''$$

Since the total quantity of charge in capacitors connected to the third node $N_3$ is conserved, the following equation (11) is satisfied:

$$Ql' + Qc' - Qb' = Ql'' + Qc'' - Qb''$$

Based on the equations (6) through (11), the voltages V1" and V2" applied to the first node $N_1$ and the second node $N_2$ can be obtained using the following equation (12):

$$V1'' = Vd + (Vd - V0) \frac{C1 \cdot Cb}{C1 \cdot Ch + Ch \cdot Cb + Cb \cdot C1}$$

$$V2'' = Vd - (Vd - V0) \frac{Ch \cdot Cb}{C1 \cdot Ch + Ch \cdot Cb + Cb \cdot C1}$$

Here, $$V0 = \frac{(Cb \cdot Vd + Cc \cdot V4) - Cb(V1 - V2)}{Cb + Cc}.$$

Therefore, if the data voltage Vd is a positive-polarity voltage greater than the common voltage $V_{com}$ (e.g., 0 V), the pixel voltage V1" of the first sub pixel $SP_1$ rises compared to the data voltage Vd, while the pixel voltage V2" of the second sub pixel $SP_2$ drops compared to the data voltage Vd. In contrast, if the data voltage Vd is a negative-polarity voltage smaller than the common voltage $V_{com}$ (e.g., 0 V), the pixel voltage V1" of the first sub pixel $SP_1$ drops compared to the data voltage Vd, while the pixel voltage V2" of the second sub pixel $SP_2$ rises compared to the data voltage Vd. Accordingly, the absolute value of the pixel voltage V1" of the first sub pixel $SP_1$ is larger than that of the pixel voltage V2" of the second sub pixel $SP_2$ all the time.

As described above, if the pixel voltages V1" and V2" applied to the first sub pixel $SP_1$ and the second sub pixel $SP_2$ constituting one and the same pixel are different, the lateral visibility can be improved.

FIG. 5 is a graph showing a change in the pixel voltage of a first sub-pixel electrode and a second sub-pixel electrode with respect to the data voltage applied across data lines for each frame, in which the pixel voltage is calculated based on the charge ratio Cl:Ch:Cb:Cc=2:1:0.8:2 and the data voltage changes from 6V to 2V to 6V, for example.

As shown in FIG. 5, the pixel voltage of the first sub pixel $SP_1$ rises compared to the data voltage Vd, while the pixel voltage of the second sub pixel $SP_2$ drops compared to the data voltage Vd. Accordingly, a sufficient difference between the pixel voltages of the first sub-pixel electrode and the second sub-pixel electrode can be obtained. In particular, since a difference between the pixel voltage of the second sub-pixel electrode and the data voltage is not sufficiently large, a sharp reduction in the brightness can be suppressed.

Figure 6:
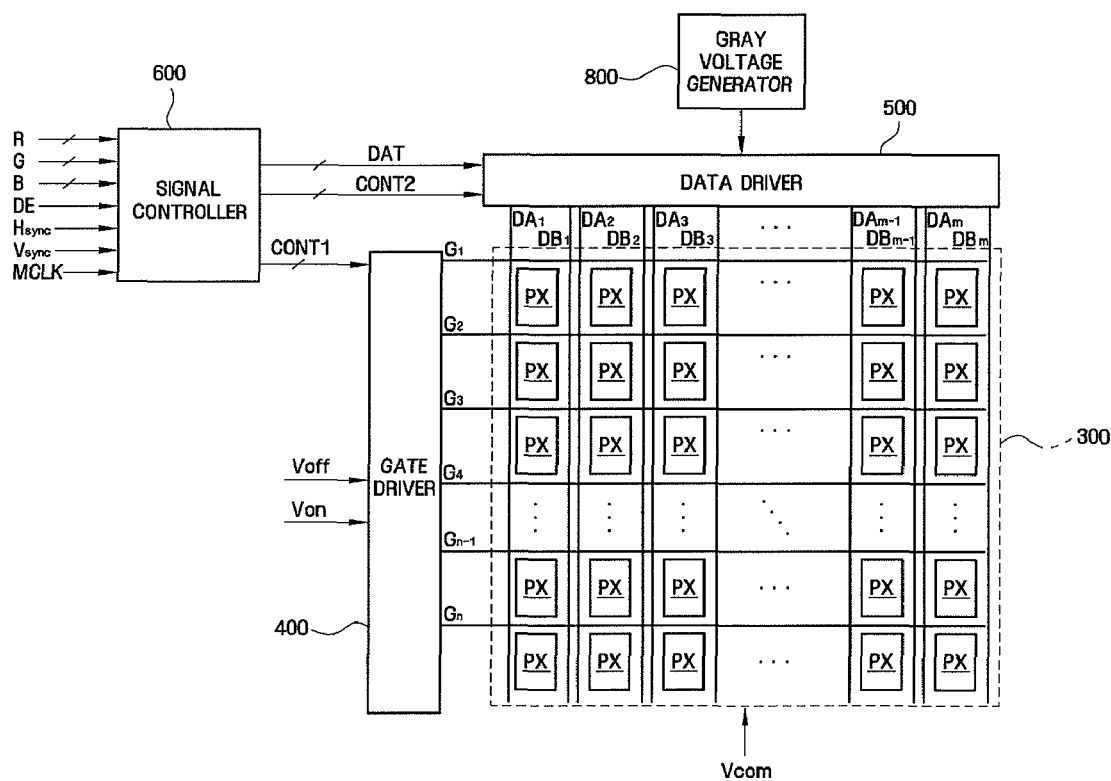
FIG. 6 is a block diagram of a liquid crystal display according to an exemplary embodiment of the present invention.
Figure 7:
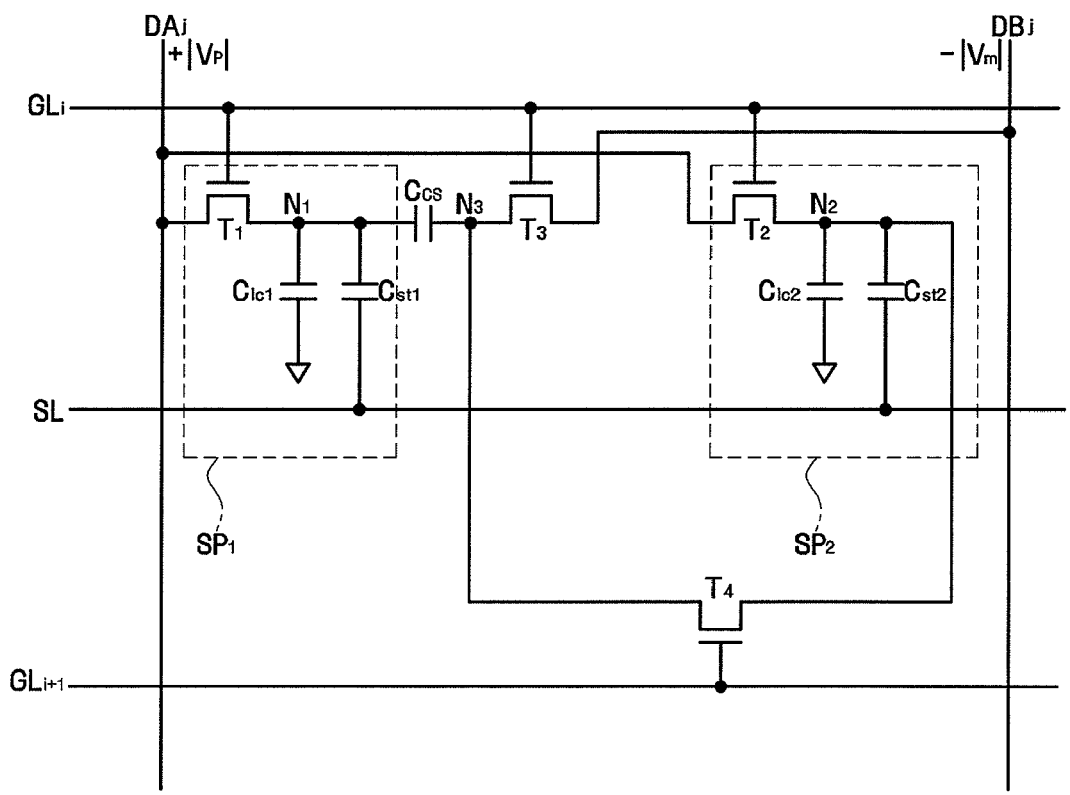
FIG. 7 is an equivalent circuit diagram of one pixel of the liquid crystal display shown in FIG. 6.
Figure 8:
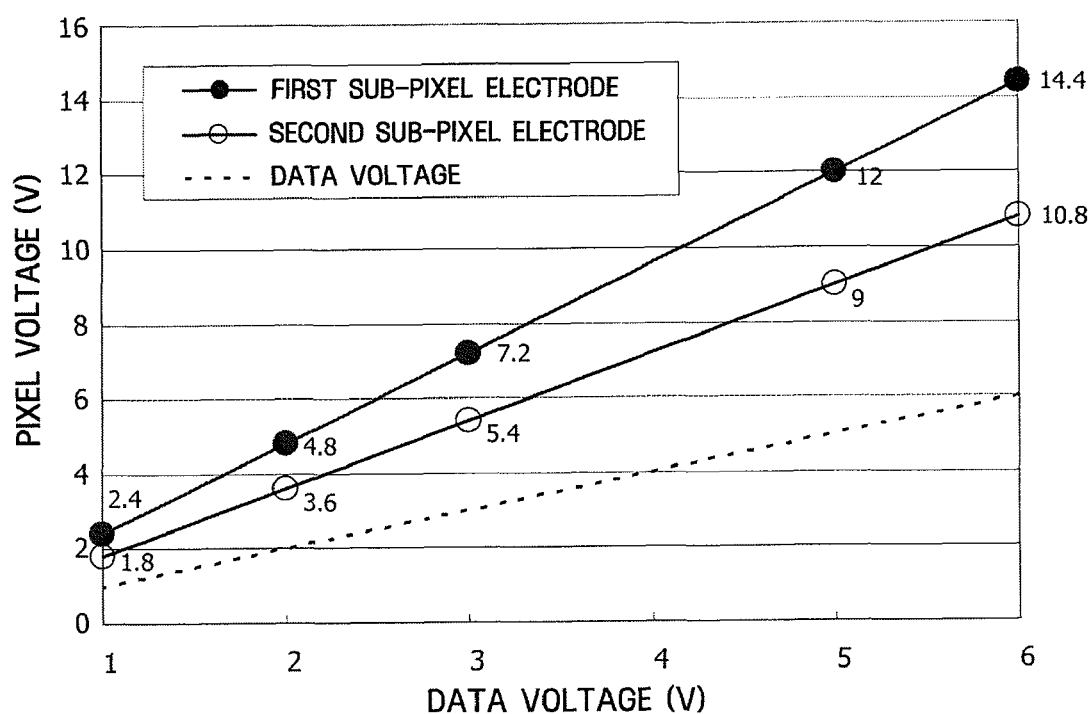
FIG. 8 is a graph showing the relationship between a data voltage and a pixel voltage in the liquid crystal display shown in FIG. 6.

Hereinafter, a liquid crystal display according to an exemplary embodiment of the present invention will be described with reference to FIGS. 6 through 8. FIG. 6 is a block diagram of a liquid crystal display according to a third exemplary embodiment of the present invention, FIG. 7 is an equivalent circuit diagram of one pixel of the liquid crystal display shown in FIG. 6, and FIG. 8 is a graph showing the relationship between a data voltage and a pixel voltage in the liquid crystal display shown in FIG. 6. For explanatory convenience, components each having the same function for describing the exemplary embodiment shown in FIGS. 1 through 3 are respectively identified by the same reference numerals, and their detailed descriptions will not be repeated.

Referring to FIG. 6, in the equivalent circuit, the liquid crystal panel assembly 300 includes a plurality of display signal lines (gate lines $G_1$-$G_n$ and data lines $D_1$-$D_m$) and a plurality of pixels PX connected to the signal lines and arranged in a matrix. The liquid crystal panel assembly 300 includes lower and upper panels which face each other and a liquid crystal layer interposed between the panels.

The plurality of display signal lines are provided on the lower panel and include a plurality of gate lines $G_1$-$G_n$ for transmitting gate signals, a plurality of data lines $DA_1$-$DA_m$ for transmitting data signals, and a plurality of charge-sharing wires $DB_1$-$DB_m$ for transmitting charge sharing signals to switching elements. The gate lines $G_1$-$G_n$ substantially extend in a row direction and are substantially parallel to one another. The data lines $DA_1$-$DA_m$ extend in a column direction and are substantially parallel to one another. The charge-sharing wires $DB_1$-$DB_m$ extend in a direction substantially perpendicular to the data lines $DA_1$-$DA_m$.

Referring to FIG. 7, the liquid crystal display according to an exemplary embodiment, unlike the liquid crystal display previously described, a charge-sharing wire $DB_j$ is formed to be substantially parallel to a data line $DA_j$ in each pixel. The third switching element $T_3$ has a control terminal connected to the ith gate line $GL_i$, an output terminal connected to the output terminal of the first switching element $T_1$ with a charge-sharing capacitor $C_{CS}$ interposed therebetween, and an input terminal connected to the charge-sharing wire $DB_j$.

A data voltage (e.g., +|Vp|), which is a positive-polarity data and is greater than the common voltage $V_{com}$, is applied to the data line $DA_j$, and a charge-sharing voltage (e.g., −|Vm|), which is negative-polarity data and is smaller than the common voltage $V_{com}$, is applied to the charge-sharing wire $DB_j$. Here, the positive-polarity voltage means a voltage greater than the common voltage $V_{com}$, and the negative-polarity voltage means a voltage smaller than the common voltage $V_{com}$.

Although in the previously described exemplary embodiment, the common voltage $V_{com}$ is applied to the input terminal of the third switching element $T_3$ (that is, $V_{com}$=0V), here, a charge-sharing voltage smaller than the common voltage $V_{com}$, e.g., −|Vm|, is applied to the input terminal of the third switching element $T_3$. Therefore, if the gate-on voltage Von is applied to the ith gate line $GL_i$ and the third switching element $T_3$ is turned on, a voltage |Vp|+|Vm| is charged in the charge-sharing capacitor $C_{CS}$. Therefore, charge sharing for the first sub pixel $SP_1$ and the second sub pixel $SP_2$ is more effectively performed. As the pixel voltage calculation results, as described above in the exemplary embodiment described in connection with FIGS. 1-3, pixel voltages charged in the first sub-pixel electrode and the second sub-pixel electrode, that is, voltages V1 and V2 of first and nodes $N_1$ and $N_2$, can be given by the following equation (13):

$$V1 = |Vp| + (|Vp| + |Vm|)\frac{C1 \cdot Cb}{C1 \cdot Ch + Ch \cdot Cb + Cb \cdot C1} + 2|Vm|\frac{Cb \cdot Cb}{C1 \cdot Ch + Ch \cdot Cb + Cb \cdot C1}$$

$$V2 = |Vp| - (|Vp| - |Vm|)\frac{Ch \cdot Cb}{C1 \cdot Ch + Ch \cdot Cb + Cb \cdot C1} + 2|Vm|\frac{Cb \cdot Cb}{C1 \cdot Ch + Ch \cdot Cb + Cb \cdot C1}$$

It can be deduced from the relationship (13) that the pixel voltage V1 of the first sub pixel $SP_1$ rises relative to the data voltage 51 Vp| and the pixel voltage V2 of the second sub pixel $SP_2$ drops relative to the pixel voltage V1 of the first sub pixel $SP_1$.

Further, not only the pixel voltage V1 of the first sub pixel $SP_1$ but also the pixel voltage V2 of the second sub pixel $SP_2$ may rise relative to the data voltage |Vp|, if the following equation (14) is satisfied:

$$\frac{|Vm|}{|Vp|} \geq \frac{Ch}{2Cb + Ch}$$

As shown in equation (14), unless |Vm| is much less than |Vp|, the pixel voltages V1 and V2 can be boosted in most cases. In such cases, even if a low data voltage is supplied from a data driver, two different pixel voltages having a large level can be produced at the first sub pixel $SP_1$ and the second sub pixel $SP_2$. In a general VA (vertical alignment) mode liquid crystal display requiring a high-level data voltage, if an appropriate charge-sharing voltage is applied to the third switching element $T_3$ through the charge-sharing wire $DB_j$, a high-level pixel voltage can be obtained even by a small data voltage. Here, the polarity of the charge-sharing voltage is preferably opposite to the polarity of the data voltage. For example, if a data voltage is a positive-polarity voltage, the charge-sharing voltage is preferably a negative-polarity voltage, if the data voltage is a negative-polarity voltage, the charge-sharing voltage is preferably a positive-polarity voltage.

The operation described above may be also true for a case where the data voltage is a negative-polarity voltage smaller than the common voltage $V_{com}$.

FIG. 8 is a graph showing a change in the pixel voltage of a first sub-pixel electrode and a second sub-pixel electrode with respect to the data voltage applied across data lines, in which the pixel voltage is calculated based on the charge ratio Cl:Ch:Cb=2:1:2, for example.

As shown in FIG. 8, when a data voltage applied to data lines is 6 V, the pixel voltage of the first sub-pixel electrode increases to 14.4 V, as represented by the plotted line (-●-), and the pixel voltage of the second sub-pixel electrode also increases to 10.8 V, as represented by the plotted line (-○-). Therefore, a sufficiently large difference can be obtained between the pixel voltages charged in the first and second sub-pixel electrodes while boosting the pixel voltages of the first and second sub-pixel electrodes. Therefore, a reduction in the brightness can be prevented.

As described above, a pixel electrode is divided into a pair of sub-pixel electrodes to produce a difference in the pixel voltage between the pair of sub-pixel electrodes by charge sharing, thereby improving the lateral visibility. In addition, a switching element is connected to one end of a charge-sharing capacitor, which makes a difference in the pixel voltage between the pair of sub-pixel electrodes, thereby further improving the lateral visibility. Further, the switching element functions to prevent the pixel voltage from sharply decreasing compared to the data voltage, thereby suppressing a reduction in the brightness by charge sharing.

While exemplary embodiments of the present invention have been described for illustrative purposes, it will be understood by those of ordinary skill in the art that various changes in form and details are possible without departing from the spirit and scope of the disclosure.

What is claimed is:

1. A liquid crystal display comprising:
   first and second gate lines arranged in parallel to each other and sequentially transmitting a gate voltage;
   a data line crossing the first and second gate lines and transmitting a data voltage;
   a pixel electrode constituted by first and second sub-pixel electrodes electrically disconnected from each other;
   a first switching element connected to the first gate line, the data line, and the first sub-pixel electrode;
   a second switching element connected to the first gate line, the data line, and the second sub-pixel electrode;
   a third switching element connected to the first sub-pixel electrode across a charge-sharing capacitor; and
   a fourth switching element connected to the second gate line and the second sub-pixel electrode and connected to the first sub-pixel electrode across the charge-sharing capacitor.

2. The liquid crystal display of claim 1, further comprising a storage line parallel to the gate lines and transmitting a common voltage, wherein the third switching element has a control terminal connected to the first gate line, an output terminal connected to the charge-sharing capacitor, and an input terminal connected to the storage line.

3. The liquid crystal display of claim 2, wherein the input terminal of the third switching element is directly connected to the storage line.

4. The liquid crystal display of claim 3, wherein when a gate-on voltage is applied to the first gate line, a voltage corresponding to a difference between the data voltage and the common voltage is charged in the charge-sharing capacitor.

5. The liquid crystal display of claim 2, wherein the input terminal of the third switching element is connected to the storage line via an auxiliary capacitor.

6. The liquid crystal display of claim 1, further comprising a charge-sharing wire parallel to the data line and transmitting a charge-sharing voltage, wherein the third switching element has a control terminal connected to the first gate line, an output terminal connected to the charge-sharing capacitor, and an input terminal connected to the charge-sharing wire.

7. The liquid crystal display of claim 6, wherein the polarity of the charge-sharing voltage is opposite to the polarity of the data voltage.

8. The liquid crystal display of claim 6, wherein after charge sharing is performed between the pixel voltages of the first and second sub-pixel electrodes, the pixel voltages of the first and second sub-pixel electrodes are boosted relative to the data voltage.

9. The liquid crystal display of claim 8, further comprising:
   a first liquid crystal (LC) capacitor and a first storage capacitor which are cascade-connected to the first switching element; and
   a second LC capacitor and a second storage capacitor cascade-connected to the second switching element, wherein the data voltage and the charge-sharing voltage satisfy the following relationship:

$$\frac{|Vm|}{|Vp|} \geq \frac{Ch}{2Cb + Ch}$$

wherein Vp is a data voltage, Vm is a charge-sharing voltage, Ch denotes a capacitance sum of the first LC capacitor and the first storage capacitor, and Cb denotes a capacitance of the charge-sharing capacitor.

10. The liquid crystal display of claim 1, further comprising lower and upper panels facing each other, and a liquid crystal layer interposed between the panels.

11. A liquid crystal display comprising:
   a gate driver driving first and second gate lines arranged in parallel to each other and sequentially transmitting a gate voltage;
   a data driver driving a data line crossing the first and second gate lines and transmitting a data voltage;
   a signal controller controlling the gate driver and the data driver;
   a pixel electrode constituted by first and second sub-pixel electrodes electrically disconnected from each other;
   a first switching element connected to the first gate line, the data line, and the first sub-pixel electrode;
   a second switching element connected to the first gate line, the data line, and the second sub-pixel electrode;
   a third switching element connected to the first sub-pixel electrode across a charge-sharing capacitor; and
   a fourth switching element connected to the second gate line and the second sub-pixel electrode and connected to the first sub-pixel electrode across the charge-sharing capacitor.

12. The liquid crystal display of claim 11, further comprising a storage line parallel to the gate lines and transmitting a common voltage, wherein the third switching element has a control terminal connected to the first gate line, an output terminal connected to the charge-sharing capacitor, and an input terminal connected to the storage line.

13. The liquid crystal display of claim 12, wherein the input terminal of the third switching element is directly connected to the storage line.

14. The liquid crystal display of claim 13, wherein when a gate-on voltage is applied to the first gate line, a voltage corresponding to a difference between the data voltage and the common voltage is charged in the charge-sharing capacitor.

15. The liquid crystal display of claim 12, wherein the input terminal of the third switching element is connected to the storage line via an auxiliary capacitor.

16. The liquid crystal display of claim 11, further comprising a charge-sharing wire parallel to the data line and transmitting a charge-sharing voltage, wherein the third switching element has a control terminal connected to the first gate line, an output terminal connected to the charge-sharing capacitor, and an input terminal connected to the charge-sharing wire.

17. The liquid crystal display of claim 16, wherein the polarity of the charge-sharing voltage is opposite to the polarity of the data voltage.

18. The liquid crystal display of claim 16, wherein after charge sharing is performed between the pixel voltages of the first and second sub-pixel electrodes, the pixel voltages of the first and second sub-pixel electrodes are boosted relative to the data voltage.

19. The liquid crystal display of claim 18, further comprising:

a first liquid crystal (LC) capacitor and a first storage capacitor which are cascade-connected to the first switching element; and a second LC capacitor and a second storage capacitor cascade-connected to the second switching element, wherein the data voltage and the charge-sharing voltage satisfy the following relationship:

$$\frac{|Vm|}{|Vp|} \geq \frac{Ch}{2Cb + Ch}$$

wherein Vp is a data voltage, Vm is a charge-sharing voltage, Ch denotes a capacitance sum of the first LC capacitor and the first storage capacitor, and Cb denotes a capacitance of the charge-sharing capacitor.

20. The liquid crystal display of claim 11, further comprising lower and upper panels facing each other and a liquid crystal layer interposed between the panels.

* * * * *